No. 670,318. Patented Mar. 19, 1901.
H. E. GRABAU.
CIGARETTE MACHINE.
(Application filed Mar. 20, 1899.)
(No Model.) 10 Sheets—Sheet 1.

Fig. 1.

No. 670,318.　　　　　　　　　　　　　　　Patented Mar. 19, 1901.
H. E. GRABAU.
CIGARETTE MACHINE.
(Application filed Mar. 20, 1899.)

(No Model.)　　　　　　　　　　　　　　　　　　　　　10 Sheets—Sheet 3.

Fig. 3.

No. 670,318. Patented Mar. 19, 1901.
H. E. GRABAU.
CIGARETTE MACHINE.
(Application filed Mar. 20, 1899.)
(No Model.) 10 Sheets—Sheet 4.

Witnesses
J. G. Hinkel
Arthur A. Fisher

Inventor
Hans Edgar Grabau
by Foster Freeman
Attorney

No. 670,318. Patented Mar. 19, 1901.
H. E. GRABAU.
CIGARETTE MACHINE.
(Application filed Mar. 20, 1899.)
(No Model.) 10 Sheets—Sheet 6.

Witnesses
J. G. Hinkel
Arthur A. Fisher

Inventor
Hans Edgar Grabau
by Foster Freeman
Attorneys

UNITED STATES PATENT OFFICE.

HANS EDGAR GRABAU, OF HOBOKEN, NEW JERSEY.

CIGARETTE-MACHINE.

SPECIFICATION forming part of Letters Patent No. 670,318, dated March 19, 1901.

Application filed March 20, 1899. Serial No. 709,780. (No model.)

*To all whom it may concern:*

Be it known that I, HANS EDGAR GRABAU, a subject of the Emperor of Germany, residing at Hoboken, in the county of Hudson and State of New Jersey, have invented certain new and useful Improvements in Cigarette-Machines, of which the following is a specification.

This invention relates to means for molding, wrapping, and tucking the wrappers of cigarettes; and it consists of certain apparatus fully described hereinafter and illustrated in the accompanying drawings, in which—

Fig. 15 is an enlarged section of the tobacco feeding and compressing devices. Fig. $15^a$ is a face view of the feed-roll; Fig. $15^b$, an end view of a roll for short-cut tobacco.

Figure 2:
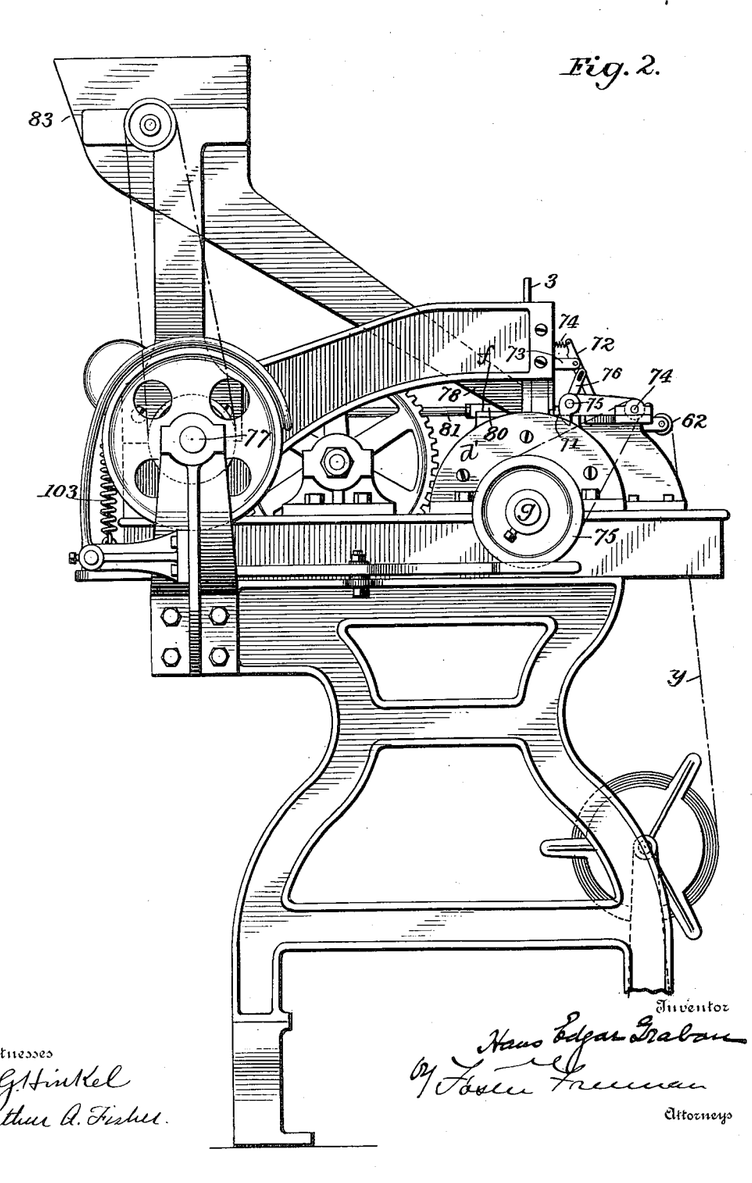
Fig. 2 is an elevation of the opposite side.
Figure 3:
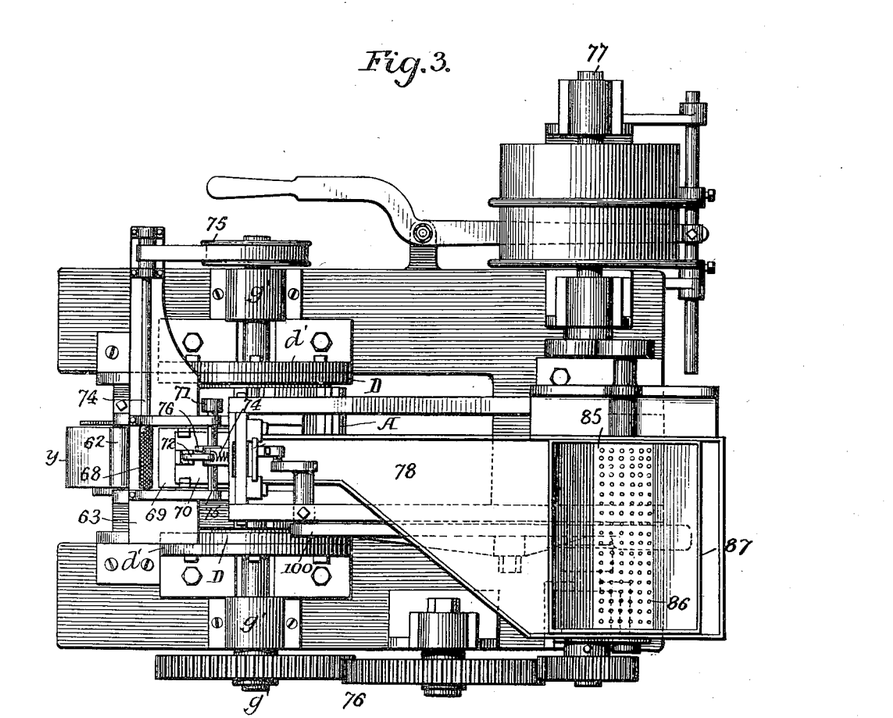
Fig. 3 is a plan view.
Figure 8:
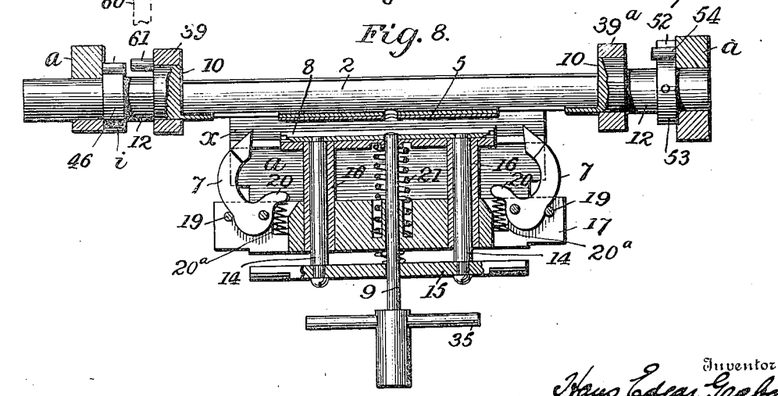
Fig. 8 is a longitudinal section on the line 8 8, Fig. 5.
Figure 12:
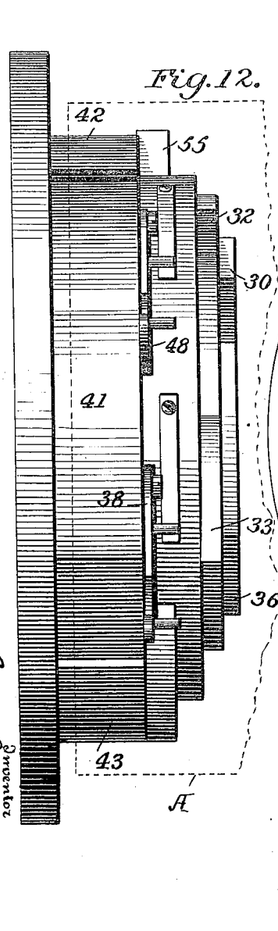
Fig. 12 is an edge view of one of the cams.
Figure 14:
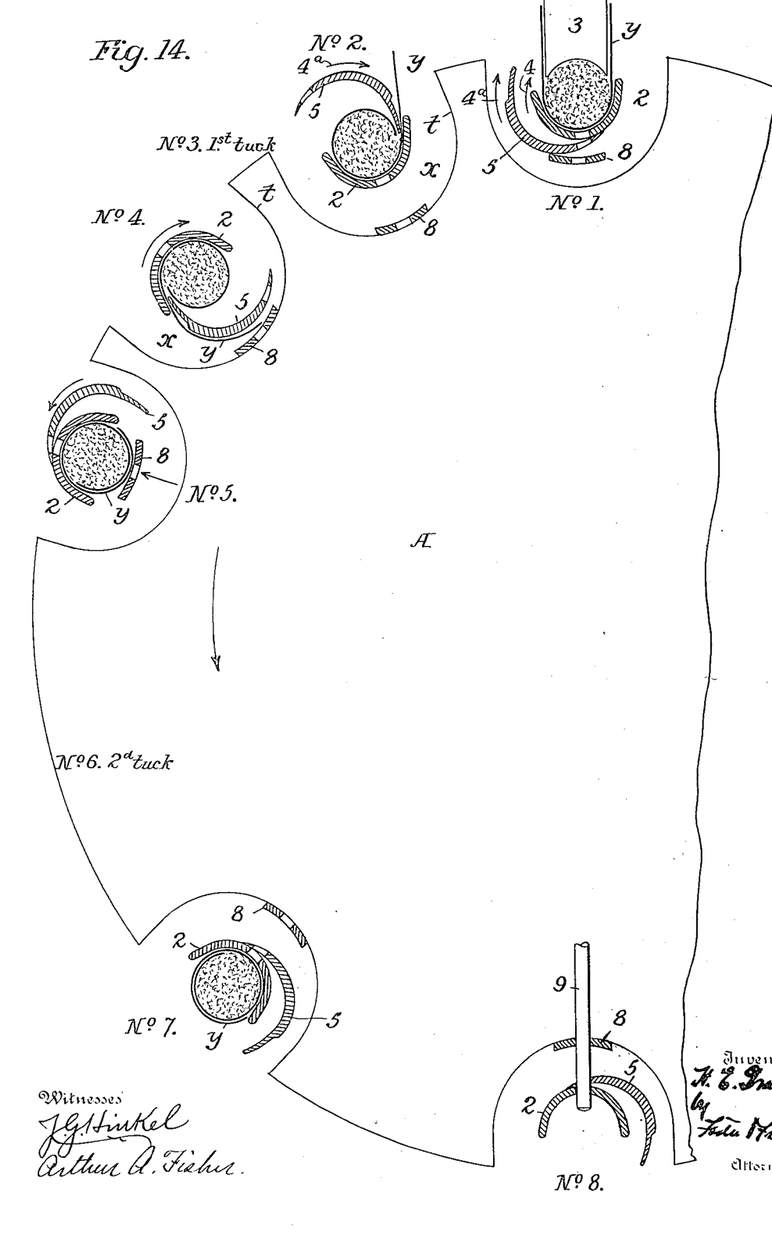
Fig. 14 is a diagram illustrating the wrapping actions.

The wrapping apparatus will first be described, and it may be employed with different means for operating the parts and for supplying a filler, premising that a number, as six, of such wrapping apparatus are carried by a rotating drum A, Figs. 4, 12, and 14, mounted on a shaft $g$, turning in bearings of the main frame, Figs. 2, 3, and 4, which drum is a hollow cylinder turning outside of two stationary cams D D, one extending inside each end of the drum. Each molding apparatus consists of a frame $a$, Figs. 6 and 3, bolted in position on the cylinder A and having a longitudinal curved channel $x$, in which turns a curved mold 2, open along one side, and when this is uppermost, as shown at the point No. 1 diagram, Fig. 14, a mass of the tobacco constituting the filler is introduced and compressed upon the paper wrapper-strip $y$ by a plunger 3, a compressor-blade 8 rising to support the mold at the bottom. The said diagram illustrates successive actions in wrapping the filler as the drum turns in the direction of its arrow. As the plunger 3 rises the mold 2 turns slightly in the direction of the arrow 4, permitting the withdrawal of the plunger as the drum turns. A curved folder-blade 5 then begins to swing in the direction of its arrow $4^a$, as shown at the point No. 2, to fold in one side of the wrapper-strip $y$ onto the filler. As the mold reaches the point No. 3 the tuckers 7 7, Figs. 5, 7, and 8, are thrown upward and partly tuck in the ends of the paper and then are immediately retracted. At point No. 4 the mold 2 and folder-blade 5 rock together to bring the bottom portion of the mold outward, and thereby also carry the other edge of the wrapper-strip $y$ against the face $t$ of the recess $x$, and this folds the strip over the outer face of the blade 5, as shown. The folder then moves to its first position, as at point No. 5, when the compressor 8 is brought down to press the lapping sides of the paper strip closely upon each other, as also in position No. 5. Thereafter at position No. 6 the tuckers 7 7 again move up and complete the tucking in of the ends of the wrapper and are then drawn back, when as the mold reaches the point No. 7 it is turned with its open side outward, and at point No. 8 a discharging-pin 9, Figs. 6 and 8, is moved radially outward and forces the cigarette from the mold.

Figure 9:
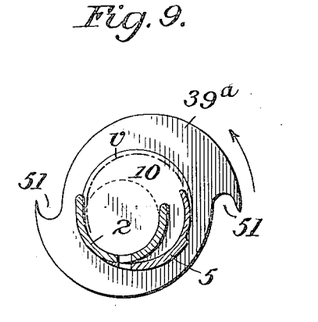
Fig. 9 is an enlarged transverse section of one of the molding devices in the direction of the arrow $9^a$, Fig. 5.
Figure 10:
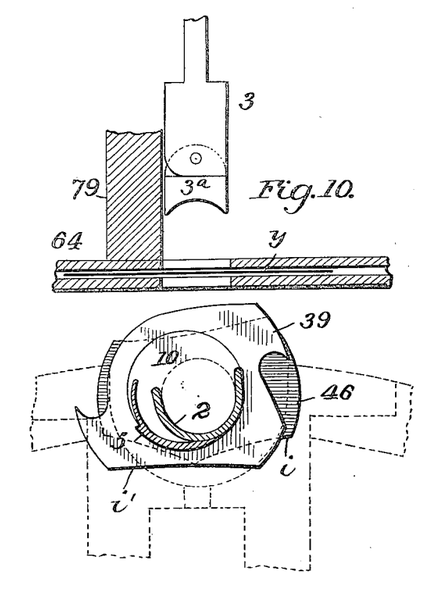
Figs. 10 and 11 are enlarged views illustrating a modification of the plunger.
Figure 11:
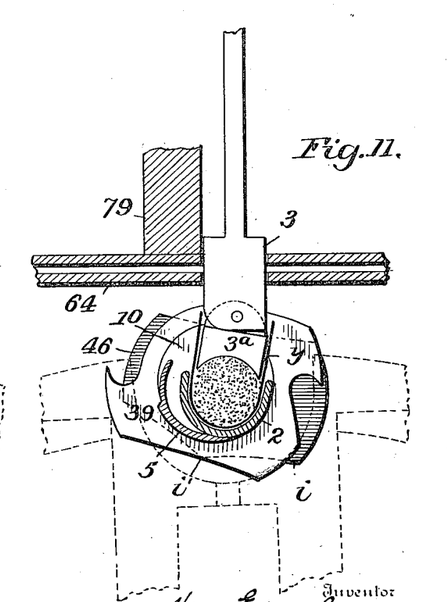
Figure 13:
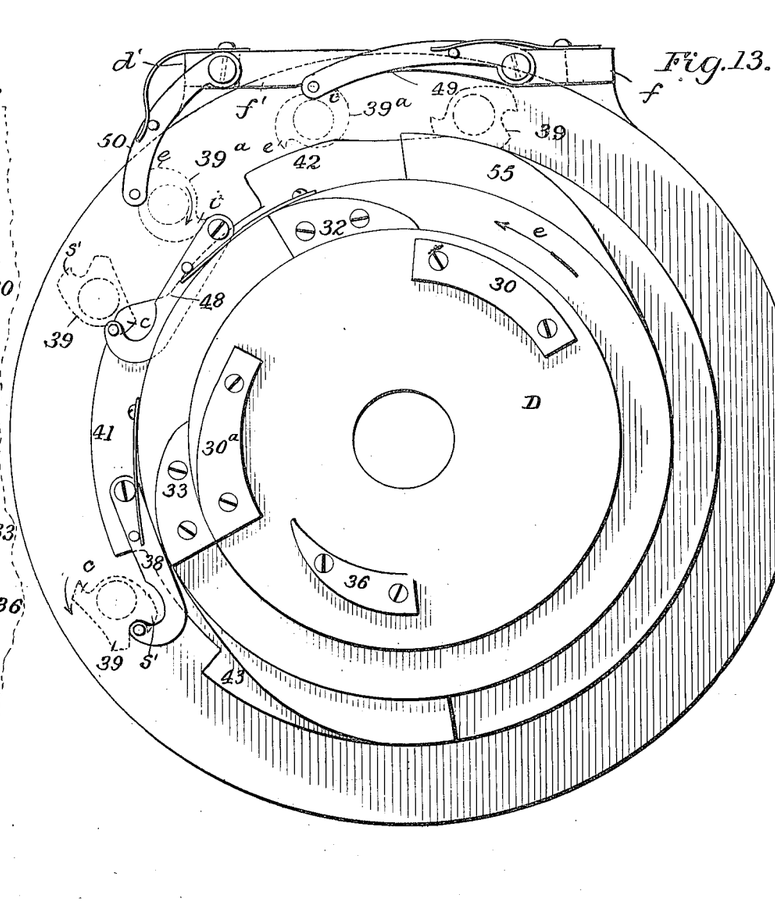
Fig. 13 is a face view of one of the cams, Fig. 12.

The mold and the tuckers, the compressor, and the discharging-pin may be mounted and operated in any suitable manner. As shown, the mold is carried by and between two disks 10 10, Figs. 6 to 8, each having a trunnion 12, extending from one side of the same into bearings of the frame $a$, the peripheries of the disks 10 being eccentric to the axes of said trunnions, and on these peripheries turn rings 39 $39^a$, to which are secured the ends of the folder-blade 5, prevented from longitudinal movement by lugs n n, Fig. 5. When the rings 39 are turned in the direction of the arrow, Fig. 9, the folder-blade will be carried over and into the inside of the mold, as indicated by the dotted line v, Fig. 9. The compressor 8 is a blade lying at the bottom of the channel, as best shown in Figs. 6 and 8, and is connected to the ends of two guide-rods 14 14, connected by a cross-bar 15, which when moved radially outward carries the compressor-blade with it, the said guide-rods sliding in tubular guides 16, extending inward from the frame a. Upon the guides 16 slides a bar 17, to which are pivoted the two tucker-fingers 7 7, each limited in its outward movement by a pin 19 and having at the inner end an arm 20, which when the bar 17 is lifted strikes a part of the frame a, whereby as the bar continues its upward movement the tuckers are swung inward upon their pivots and as the bar descends a spring 20ª throws each tucker-finger outward against its pin 19. A spring 21 tends to throw the bar 17 inward. The different movements radially outward of the bar 17, the bar 15, and the discharging-pin 9 are effected by means of the two cams D D within the drum or cylinder A and having the various cam projections. (Shown in Figs. 12 and 13.) As the mold reaches its upper position No. 1, Fig. 14, the compressor 8, Fig. 6, is thrust outward to support the mold to resist the strains resulting from the downward action of the plunger 3 by means of the projections 30, Figs. 12 and 13, over the curved edges of which ride the rounded under ends of the bar 15, moving in the direction of the arrow e, Fig. 13, and when the bar 15 leaves the ends of the projections 30 the said bar, with the compressor-blade, will be thrown downward by the springs 31, Fig. 6. The bar 15 and compressor 8 are again thrown out to compress the folder-wrapper by projections 30ª when the parts reach the position No. 5, Fig. 14. The bar 17, which carries the tuckers, is lifted as its ends travel over the curved edges of the projections 32, Fig. 13, and is thrown inward by the spring 21 as the bar passes the ends of said projections 32 and is again lifted as it passes over the curved edges of the projections 33. The discharging-pin 9 is provided with a cross-bar 35, and the latter is thrown outward with the pin as the bar 35 travels over the curved edges of the projections 36, Fig. 13.

One of the trunnions 12 of the mold carries near one end a cam 46, Figs. 6, 8, 10, and 11. As the drum turns around the cams D D the face i of the cam 46 travels over projecting portions 42 41 43, Fig. 13, which during this time maintains the mold in its position steadily, so that it cannot rock. As soon as the cam 46 reaches the cut-away portion between the projections 42 and 41 the mold can be turned. In like manner the faces i' of the rings 39 ride over the parts 42 41 43, and the folder-blade is thus held in position, but can be reversed as the rings are brought between said projections. The rings 39 39ª have hooks extending in reverse directions, so as to engage successively pawls 49 50 48 38, Fig. 13, hung two outside and two inside the drum A. Thus as the upper hook $i^2$ of the ring 39ª engages the end of pawl 49, Fig. 13, the ring 39ª is turned until the hook e is uppermost and the folder-blade 5 is in the position No. 2, Fig. 14. After the drum rotates farther the hook e engages the end of the pawl 50, which turns the ring 39ª and folder-blade farther in the direction of the arrow to the position No. 4, Fig. 14. The further rotation of the drum carries the ring 39 to a position for its hook c to engage the pawl 48 when the ring and folder-blade are turned back as the drum rotates to the position No. 5, Fig. 14, and on the hook s' engaging the pawl 38, the ring 39 and blade are turned farther in the same direction to the position No. 7, Fig. 14. The pawls 49 50 are pivoted to lugs f f', extending from stationary cheek-pieces d' outside of the cams D D. (See Figs. 12 and 13.) The pawls by thus successively engaging the hooks on the rings turn the folder-blade and mold to the positions before described, and when the mold has been rocked around to its full extent a shoulder 52, Figs. 7 and 8, upon a disk 53 on one of the trunnions makes contact with a pin 54, projecting from the frame a, the movement being thus limited. As before described, after the plunger 3 descends, pressing the filler in the mold, it is necessary for the mold to rock back to a slight extent in the direction of the arrow 4, position No. 1, Fig. 14, and this is effected by the projection 55, Fig. 13, which engages the curved edge i, Fig. 11, of the cam 46. As soon as the cam 46 passes from the said projection 55 the mold is turned back to its original position, No. 1, Fig. 14, by means of a spring 60, dotted lines, Fig. 5, secured to the drum and extending over pins 61 61, projecting from one of the rings 39. The ring may be turned in either direction, thus lifting the spring; but when the ring is released the spring will press upon the elevated pin and turn the ring until the spring rests on both pins.

Figures 4, 19:
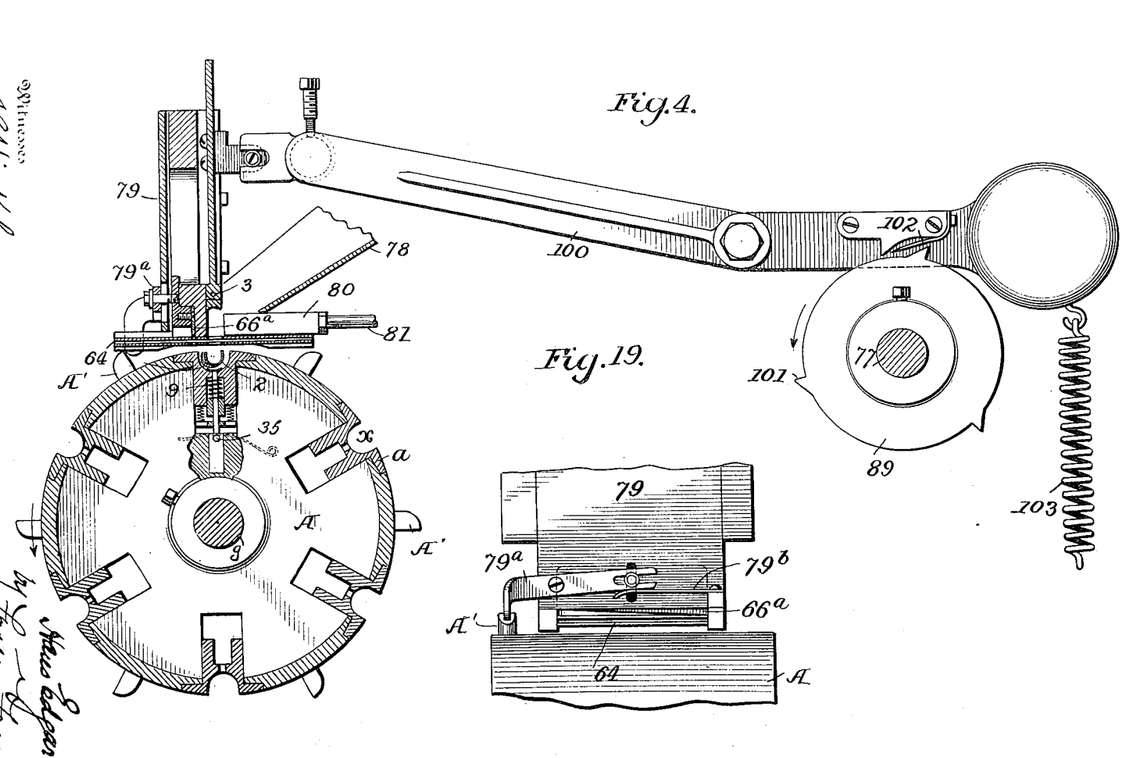
Fig. 4 is a section of the mold-drum and filler-compressing devices.
Fig. 19 is a modification of the cutter.
Figures 5, 6, 7:
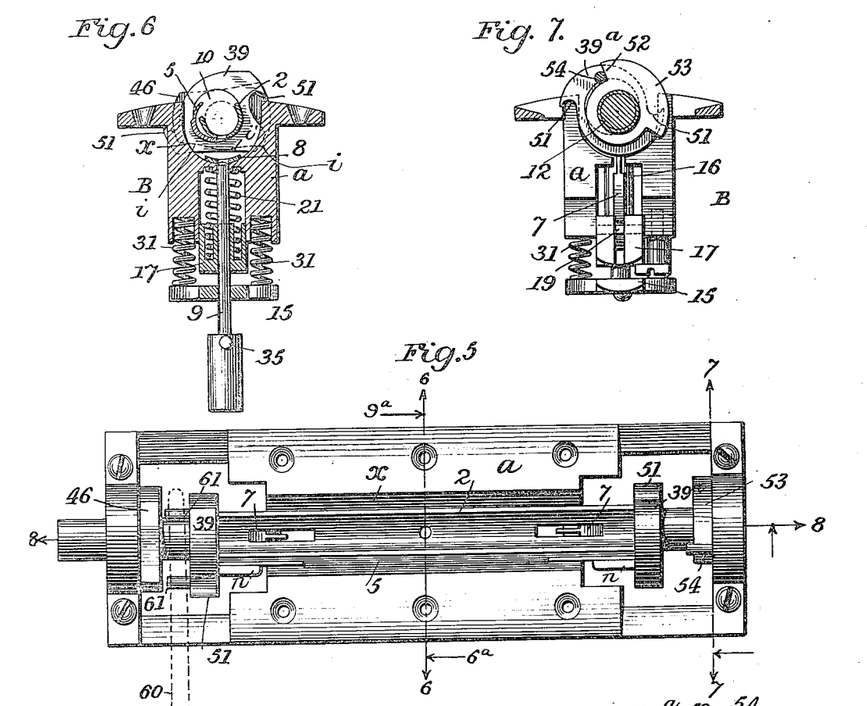
Fig. 5 is a plan of one of the molds and frame enlarged.
Fig. 6 is a transverse section on the line 6 6, Fig. 5, looking in the direction of the arrow $6^a$.
Fig. 7 is a section on the line 7 7, Fig. 5.
Figures 16, 17, 18:
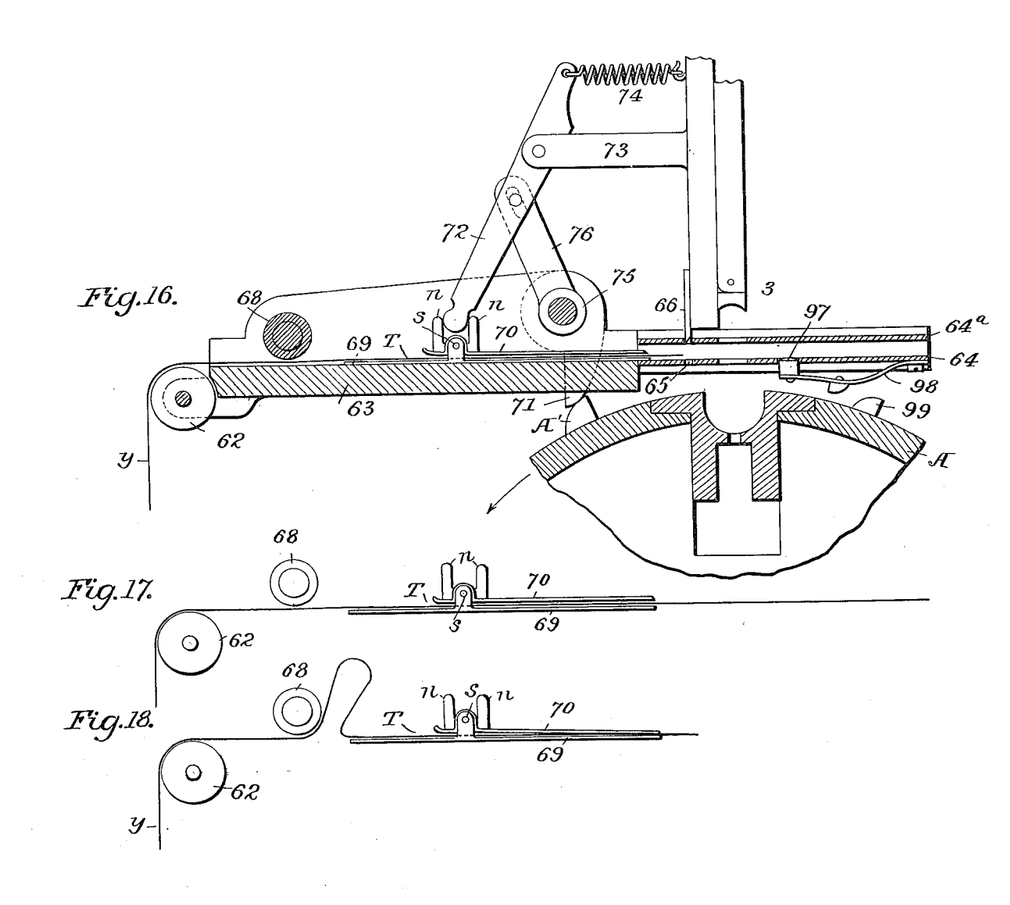
Figs. 16, 17, and 18 are enlarged sections of the paper feeding and cutting devices.

The paper y, Figs. 16 to 18, is fed by the feeding action of a roll 68 from the forward part of the machine over a roller 62, across the table 63, and onto a continuation 64 of the table, having a slot 65, through which shears a knife 66ª, Fig. 4. As shown in Figs. 4 and 19, the knife-blade 66ª is operated by a lever 79ª, forked at one end to receive a pin projecting from the blade and rocked in one direction by a spring 79ᵇ and in the other by a lug A' on the drum A. Means are provided whereby there is a continuous feeding of the paper strip, while at the same time the forward end of the paper stops as the shearing-blade descends into the opening 65. This is effected by means of the continuously-rotating feed-roll 68 and a reciprocating clamp T. This has a lower blade 69 and upper blade 70, pivoted at s and provided with lugs n n, receiving between them the end of a lever 72, pivoted to a stationary arm 73, actuated in one direction by a spring 74 and in the other by an arm 76 on a rock-shaft 75, having an arm 71, which is vibrated by the projection A' on the drum A. When the arm 72 moves outward, it strikes the outer lug n, lifts the upper blade 70, and carries the clamp outward, and the paper can feed freely through the clamp by the action of the roll 68. As the arm 72 swings in, thereby striking the inner lug n, the upper plate 70 is brought to bear upon and clamp the paper, which buckles up, as shown in Fig. 18, and as the clamp is carried inward the bend of the paper is straightened. A presser-finger 97 on a spring-arm 98, is then forced up by a lug 99 against the under side of the paper and binds the end of the paper momentarily against a top plate $64^a$, thus holding the paper while the clamp T opens and moves outward.

Figure 1:
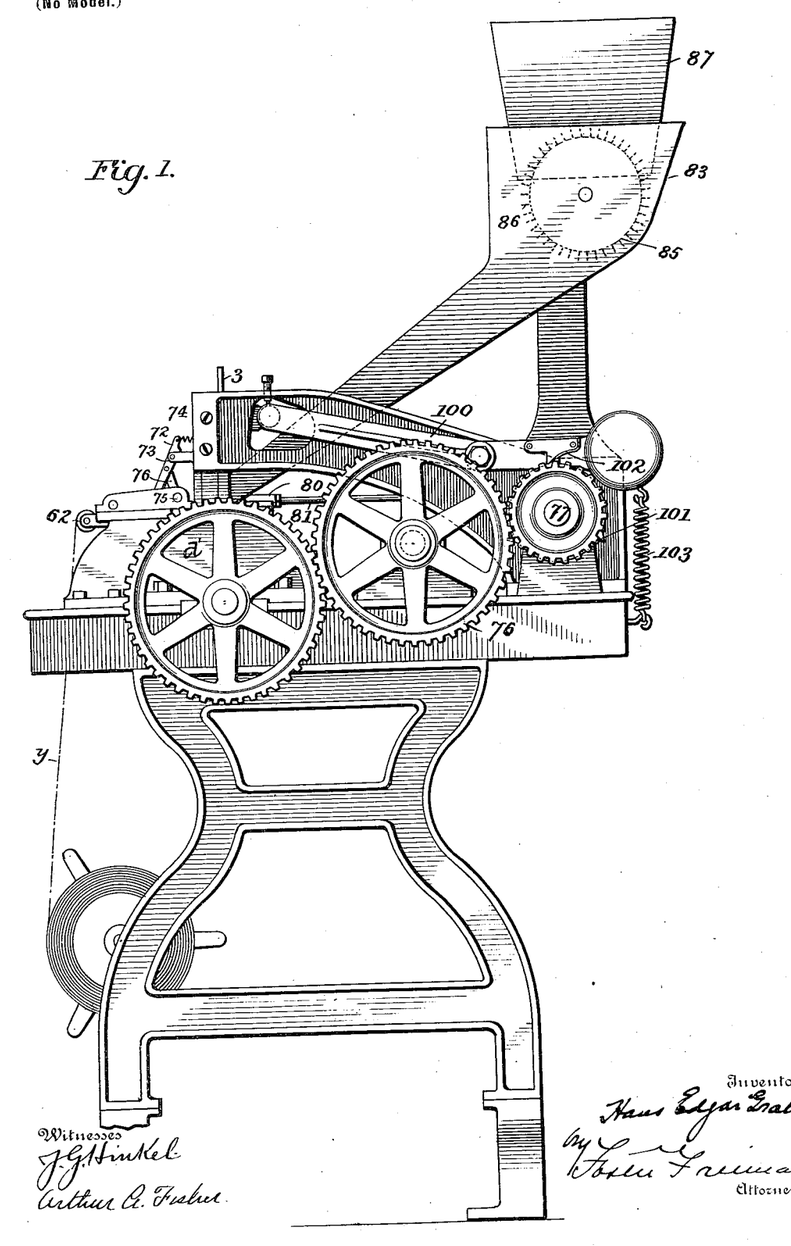
Figure 1 is a side elevation of one form of apparatus which may be employed.
Figures 15, 15A, 15B:
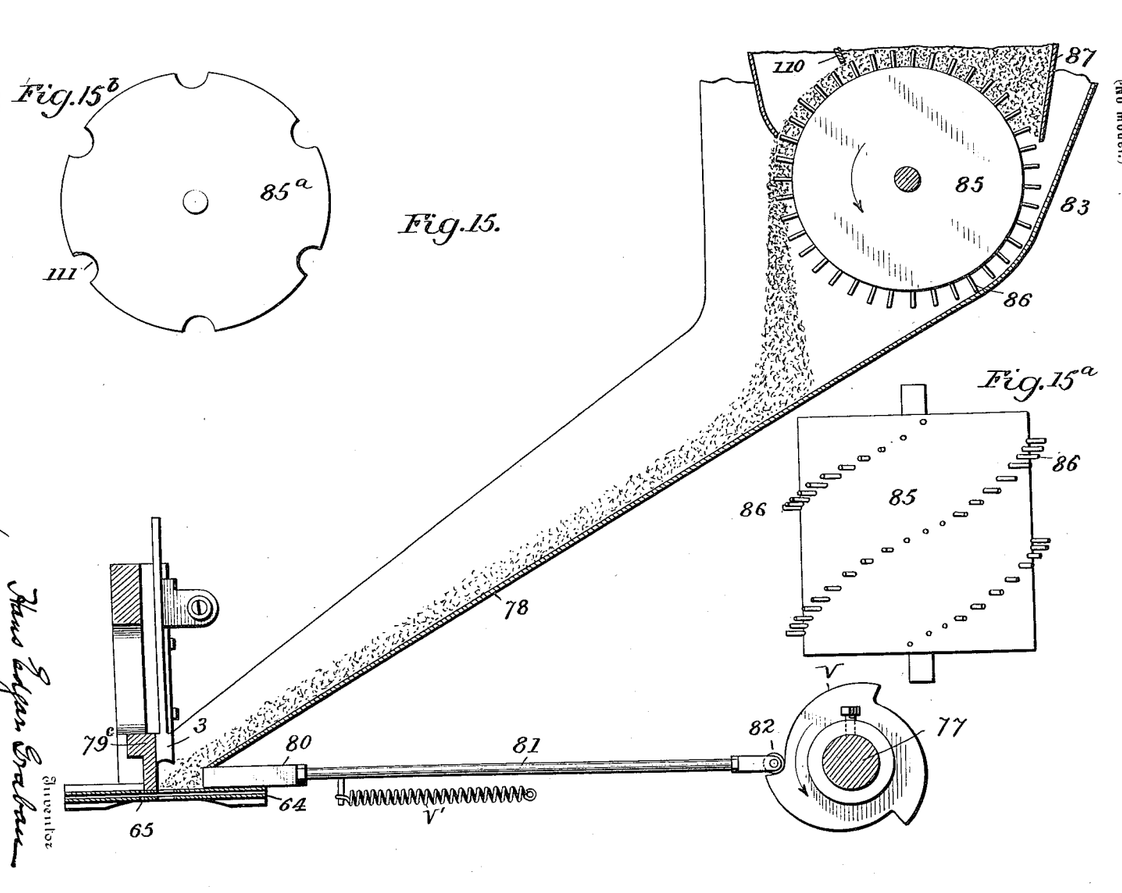

The tobacco is fed through the chute 78 of a casing 83, Figs. 4 and 15, beneath the plunger 3, which reciprocates at the back of a vertical plate $79^c$ and has a grooved lower edge and is compressed between the plate $79^c$ and a compressor-bar 80, which moves back to allow the tobacco to fall between it and the plate $79^c$ and is then carried forward to the position shown in Fig. 4, after which the plunger 3 descends. The compressor is reciprocated in any suitable manner—as, for instance, by means of a connecting-rod 81 and cam $v$ on the shaft 77 acting on an antifriction-roller 82. The tobacco falls onto a feed-roll 85, provided with teeth 86 and turning below a hopper 87, Figs. 1 and 15, into which the tobacco is introduced. The roller rotates in the direction of its arrow and carries the tobacco into the chute 78, from which it falls into position in front of the compressor 80.

To facilitate the turning of the drum without full elevation of the plunger 3, the lower end portion $3^a$ of the plunger is pivoted to the part above, so as to swing slightly outward. (See Fig. 11.)

As shown in Fig. 15, a plate 110 on a plane extending radially from the axis of the feed-roll 85 is arranged in the hopper, so that the action of the pins in carrying the long tobacco toward said plate does not tend to pack it thereon; but, on the contrary, will act to force it upward away from the pins, except such quantity as is embedded in the pins. Any surplus, however, carried below the edge of the plate 110 will be distributed in the space beyond the plate 110 and will be carried evenly by the pins beneath the edge of the casing and evenly and regularly discharged into the chute.

Preferably the pins are arranged spirally upon the face of the roll, as illustrated in Fig. $15^a$, and the roll is turned at such a speed that a sufficient number of pins will pass below the edge of the plate 110 during a determined time to supply the next mold which is to be filled. By increasing the speed of rotation the amount discharged is increased.

For short-cut tobacco a roll $85^a$, Fig. $15^b$, is used, with peripheral pockets 111, and the plate 110 is set down with its edge close to the roll.

Other modifications will suggest themselves to those skilled in the art and need not be described herein in detail, and the invention therefore is not limited to the specific details shown.

What I claim is—

1. The combination of a U-shaped mold, a folder-blade parallel to the mold, and means for carrying the blade around an axis between the sides of the mold across and into and out of the mold, substantially as described.

2. The combination of a rotating drum, a series of rocking molds carried by said drum, and a folder-blade arranged parallel and adjacent to each mold to fold the wrapper-strip over the filler in the mold, substantially as described.

3. The combination of a rotating drum, a series of molds carried by said drum parallel to the axis thereof, means for feeding a wrapper-strip, means for collecting and compressing tobacco in one of the molds, means for successively turning in the edges of the wrapper-strip over the filler in the mold, and means for tucking in the ends of the wrapper, substantially as described.

4. The combination of a rotating drum, a series of rocking molds carried by said drum, means for compressing fillers and feeding them to the molds, and a folder-blade arranged parallel and adjacent to each mold to fold the wrapper-strip over the filler in the mold, substantially as described.

5. The combination of a rotating drum, a series of rocking molds carried by said drum, means for compressing fillers and feeding them to the molds and for carrying them into the molds, and a folder-blade arranged parallel and adjacent to each mold to fold the wrapper-strip over the filler in the mold, substantially as described.

6. The combination of the U-shaped mold, a curved folding-blade, supports for the ends of the blade, and means for turning said supports about an axis between the sides of the mold, substantially as described.

7. The combination of a mold, open at one side, means for feeding a wrapper-strip across the mold, means for feeding a filler upon the strip to the mold, and a folder parallel to the mold, means for carrying it over and into the mold to turn down one edge of the strip, and means for rotating the mold to fold over the opposite edge of the strip, substantially as described.

8. The combination with a U-shaped mold, of a slotted plate above the mold, means for feeding a wrapper-strip above said plate, means for feeding tobacco to said strip, a plunger for carrying the tobacco and strip through the plate into the mold, means for turning in the edges and means for tucking in the ends of the strip, substantially as set forth.

9. The combination of a mold, open at one side, means for feeding a wrapper-strip across the mold, means for feeding a filler upon the strip to the mold, a folder parallel to the mold and means for carrying it over and into the mold to turn down one edge of the strip, means for rotating the mold to fold over the opposite edge of the strip, and end-tucking devices, substantially as described.

10. The combination of a rocking mold, wrapper and filler feeding devices, a parallel folder and means for carrying the same over and into and out of the mold, end-tucking means, and a discharging device for ejecting the completed cigarette, substantially as described.

11. The combination with a rotating head, of a series of rocking molds arranged in channels of the head and rocking folders, wrapper and filler feeding devices, means for rocking the molds and folders to fold in the edges of the wrappers, and tucking and discharging devices, substantially as described.

12. The combination of a curved mold and eccentric disks at the ends thereof, rings turning on said disks, and a folder-blade carried between said rings, substantially as described.

13. The combination of a rotating channeled head, curved molds rotatively supported and carried by eccentric disks in said channels, folder-blades, and hooked rings turning on said disks and supporting the folder-blades, and pawls engaging the hooks to turn the same, substantially as described.

14. The combination with a rotating head, of molds supported to rock in said head, means for feeding wrappers and fillers to the molds, folder-blades, and pawls for rocking the molds and blades, substantially as described.

15. The channeled rotating head and rocking molds and folders and tuckers carried thereby, in combination with cams arranged within the head and provided with projections for operating the molds, folders and tuckers, substantially as described.

16. The channeled rotating head, and rocking molds and folders, tuckers and ejectors carried thereby, in combination with cams arranged within the head and provided with projections for operating the molds, folders, tuckers, and ejectors, substantially as described.

17. The combination with a rotating drum and a series of molds parallel to the axis of the drum, of wrapper and filler feeding devices, means for carrying the wrappers and fillers into the molds successively, means for successively folding in the edges and means for tucking in the ends of the wrapper during the rotation of the drum, substantially as described.

18. The combination with a mold, of a reciprocating plunger 3, a plate against which the plunger slides, means for compressing tobacco laterally against said plate below the plunger, and a slotted table below the plunger and above the mold, substantially as described.

19. The combination with a mold, of a reciprocating plunger, a plate against which the plunger slides, means for compressing tobacco laterally against said plate below the plunger, and a folding-blade, substantially as described.

20. The combination with a rotating mold-head, molds parallel to the axis of the head, and plunger and paper-feeding devices, of a cutter, a lever for reciprocating the same, and a spring and projections on the head for reciprocating the lever, substantially as described.

21. The combination with a reciprocating paper-cutter, of a clamp, a continuously-driven feed device for the paper, and means for opening and closing and for reciprocating the clamp, substantially as described.

22. The combination with the cutter and continuously positively operating paper-feed devices, of a clamp T provided with separable plates, and means for reciprocating the clamp and separating and bringing together the plates, substantially as described.

23. The combination with the reciprocating paper-cutter, of a clamp, a positively-operating continuously-driven feed for the paper, means for opening and closing and for reciprocating the clamp, and means for holding the end of the paper as the clamp moves out, substantially as described.

24. The combination with a cigarette-mold, of a hopper, a feed-roll, and a radially-adjustable plate 110 arranged substantially as described.

25. The combination with a cigarette-mold, of a hopper, a feed-roll, and a radially-adjustable plate 110, said feed-roll provided with teeth arranged spirally, substantially as described.

In testimony whereof I have signed my name to this specification in the presence of two subscribing witnesses.

HANS EDGAR GRABAU. [L. S.]

Witnesses:
W. E. BIRD,
E. T. TWEEDY.